(12) United States Patent
Orelind et al.

(10) Patent No.: US 7,954,053 B2
(45) Date of Patent: May 31, 2011

(54) EXTRACTION OF DATAPOINTS FROM MARKUP LANGUAGE DOCUMENTS

(75) Inventors: Greger J. Orelind, San Rafael, CA (US); August A. Jaenicke, San Francisco, CA (US)

(73) Assignee: Alexa Internaet, San Francisco, CA (US)

( * ) Notice: Subject to any disclaimer, the term of this patent is extended or adjusted under 35 U.S.C. 154(b) by 0 days.

(21) Appl. No.: 12/683,190

(22) Filed: Jan. 6, 2010

(65) Prior Publication Data
US 2010/0107055 A1 Apr. 29, 2010

Related U.S. Application Data

(62) Division of application No. 11/335,993, filed on Jan. 20, 2006, now Pat. No. 7,669,119.

(60) Provisional application No. 60/700,774, filed on Jul. 20, 2005.

(51) Int. Cl.
*G06F 17/30* (2006.01)
(52) U.S. Cl. .............. 715/234; 707/811; 707/E17.107
(58) Field of Classification Search .............. 707/811; 715/234
See application file for complete search history.

(56) References Cited

U.S. PATENT DOCUMENTS

| | | | |
|---|---|---|---|
| 6,606,625 B1 | 8/2003 | Muslea et al. | |
| 6,678,681 B1 | 1/2004 | Brin | |
| 6,714,941 B1 | 3/2004 | Lerman et al. | |
| 6,851,089 B1 | 2/2005 | Erickson et al. | |
| 6,920,609 B1 | 7/2005 | Manber et al. | |
| 7,505,984 B1 | 3/2009 | Nevill-Manning et al. | |
| 7,590,647 B2 * | 9/2009 | Srinivasan et al. | 1/1 |
| 7,593,845 B2 | 9/2009 | Ramsey | |
| 2002/0091688 A1 | 7/2002 | Decary et al. | |
| 2002/0143659 A1 | 10/2002 | Keezer et al. | |
| 2003/0177192 A1 | 9/2003 | Umeki et al. | |
| 2008/0046441 A1 | 2/2008 | Wen et al. | |
| 2008/0114800 A1 | 5/2008 | Gazen et al. | |
| 2009/0125529 A1 | 5/2009 | Vydiswaran et al. | |

OTHER PUBLICATIONS

Crescenzi, Valter et al. "Automatic Information Extraction from Large Websites". Sep. 2004, Association for Computing Machinery.*
Hemnani, Ajay et al. "Information Extraction—Tree Alignment Approach to Pattern Discovery in Web Documents". 2002, Springer.*
Reis, D. C. et al. "Automatic Web News Extraction Using Tree Edit Distance". May 2004, Association for Computing Machinery.*
Wang, Jiying et al. "Data-rich Section Extraction from HTML pages". 2002, IEEE Computer Society.*
Hogue, A. and Karger, D., "Thresher: automating the unwrapping of semantic content from the World Wide Web," Proceedings of the 14th international conference on World Wide Web, pp. 86-95, ACM Press, May 2005 (of-record in parent application).

(Continued)

*Primary Examiner* — Adam M Queler
*Assistant Examiner* — Tyler J. Schallhorn
(74) *Attorney, Agent, or Firm* — Knobbe, Martens, Olson & Bear LLP

(57) ABSTRACT

An extraction-rule generation and training system uses information obtained from multiple markup language documents (e.g. web pages) of similar structure to generate an extraction rule for extracting datapoints from markup language documents. Where the structures of two or more documents are not sufficiently similar, the system maintains separate extraction rules for the same datapoint, and applies these separate extraction rules in combination to particular markup language documents to extract the datapoint.

14 Claims, 6 Drawing Sheets

OTHER PUBLICATIONS

Meng, X. et al., "Schema-guided wrapper maintenance for web-data extraction," Proceedings of the 5th ACM international workshop on Web information and data management, pp. 1-8, ACM Press, 2003 (of-record in parent application).

Ying Zhao and George Karypis, "Evaluation of hierarchical clustering algorithms for document datasets," Proceedings of the 11th International Conference on Information and Knowledge Management, pp. 515-524, ACM Press, 2002 (of-record in parent application).

Zamir, O, Etzioni, O, Madani, O and Karp, R., "Fast and intuitive Clustering of Web Documents," Department of Computer Science & Engineering, American Association for Artificial Intelligence, 4 pages, (1997) (of-record in parent application).

Chidlovskii, Boris, "Automatic Repairing of Web Wrappers by Combining Redundant Views," (2002), IEEE Computer Society (of-record in parent application).

Liu, Ling, et al., "XWRAP: An XML-enbaled Wrapper Construction System for Web Information Sources," Mar. 2000, IEEE (of-record in parent application).

Meng, Xiaofeng, et al., "A Supervised Visual Wrapper Generator for Web-Data Extraction," (2003), IEEE Computer Society (of-record in parent application).

Raposo, Juan, et al., "Automatic Wrapper Maintenance for Semi-Structured Web Sources Using Results from Previous Queries," 2005, Association for Computing Machinery (of-record in parent application).

Hogue, Andrew W., "Tree Pattern Inference and Matching for Wrapper Induction on the World Wide Web," Massachusetts Institute of Technology, Jul. 20, 2004, http://dspace.mit.edu/handle/172.1/28406, (unprotected version retrieved from personal web site of author, secondthought.org) (of-record in parent application).

Chuang, Shui-Lung, et al., "Tree-Structured Template Generation for Web Pages," IEEE Computer Society, Sep. 2004 (of-record in parent application).

Zhai, Yanhong, et al., "Web Data Extraction Based on Partial Tree Alignment," ACM, May 2005 (of-record in parent application).

Han, Hui, et al., "Rule-based Word Clustering for Document Metadata Extraction," ACM, Mar. 2005 (of-record in parent application).

* cited by examiner

EXTRACTION OF DATAPOINTS FROM MARKUP LANGUAGE DOCUMENTS

PRIORITY CLAIM

This application is a division of U.S. application Ser. No. 11/335,993, filed Jan. 20, 2006, now U.S. Pat. No. 7,669,119, which claims the benefit of U.S. Provisional Appl. No. 60/700,774, filed Jul. 20, 2005. The disclosures of the aforesaid applications are hereby incorporated by reference.

FIELD OF THE INVENTION

This invention relates generally to methods and systems for automatically extracting information from web pages and other markup language documents.

BACKGROUND OF THE INVENTION

Web pages provide a highly flexible and effective medium for presenting information. The information on any particular web page is generally not, however, optimized for substantive analysis by machine or computer.

One type of substantive analysis of a web page that can be automated is the extraction of information from web pages. The extracted information may, for example, include a description or attribute of a news article, product, service, job listing, company, person, or any other type of item that might appear on a web page. Prior technology has often relied upon regular expression matching, which can be unreliable and which may require substantial processing. Other prior technology has tried to use structural information available in web pages to improve the extraction accuracy and lower the associated processing requirements.

U.S. Patent Pub. 2002/0143659, which is owned by the assignee of the present application and is incorporated herein by reference, describes methods by which a structural graph representation of a sampled web page, such as a Document Object Model (DOM) representation, may be used to create an extraction rule for extracting data from web pages with a similar structure. These methods take advantage of the similarity in web page structure that is common among groups of web pages of the same web site. One limitation with this approach, however, is that a rule generated from a single sampled web page sometimes will not be capable of reliably extracting desired data values from other web pages.

SUMMARY

A computer-implemented method is disclosed in which information extracted from two or more markup language documents (e.g. web pages) of similar structure is used in combination to generate an extraction rule for extracting a datapoint, such as numerical value, text string, or image, from a set of markup language documents. By using information extracted from multiple documents of similar structure, including information regarding correlations between such documents, the method produces data extraction rules that provide improved datapoint extraction reliability. The method may also support the ability to have multiple data extraction rules for the same datapoint, as may be desirable to accommodate differences between the structures of documents that include the datapoint.

In one embodiment, multiple extraction rules are initially generated for a given datapoint, with each rule being derived from, and containing information extracted from, a different respective markup language document. A rule clustering process then compares individual pairs of these extraction rules to identify extraction rules that have a sufficiently high correlation or "proximity" to be merged into a single rule. When two rules are merged in one embodiment, information that is common to the two rules is retained, while other information is discarded. The merging process may, for example, be implemented by taking the intersection between two node function matrices, each of which corresponds to one of the two rules. Any number of extraction rules that correspond to the same datapoint may be merged via this process. Also disclosed are methods for using multiple data extraction rules in combination (e.g., data extraction rules that are not sufficiently similar to be merged) to extract a datapoint from a web page or other markup language document.

DETAILED DESCRIPTION OF SPECIFIC EMBODIMENTS

Specific embodiments will now be described with reference to the drawings. These embodiments are intended to illustrate, and not limit, the present invention. The scope of the invention is defined by the claims.

a. Overview

Figure 1:
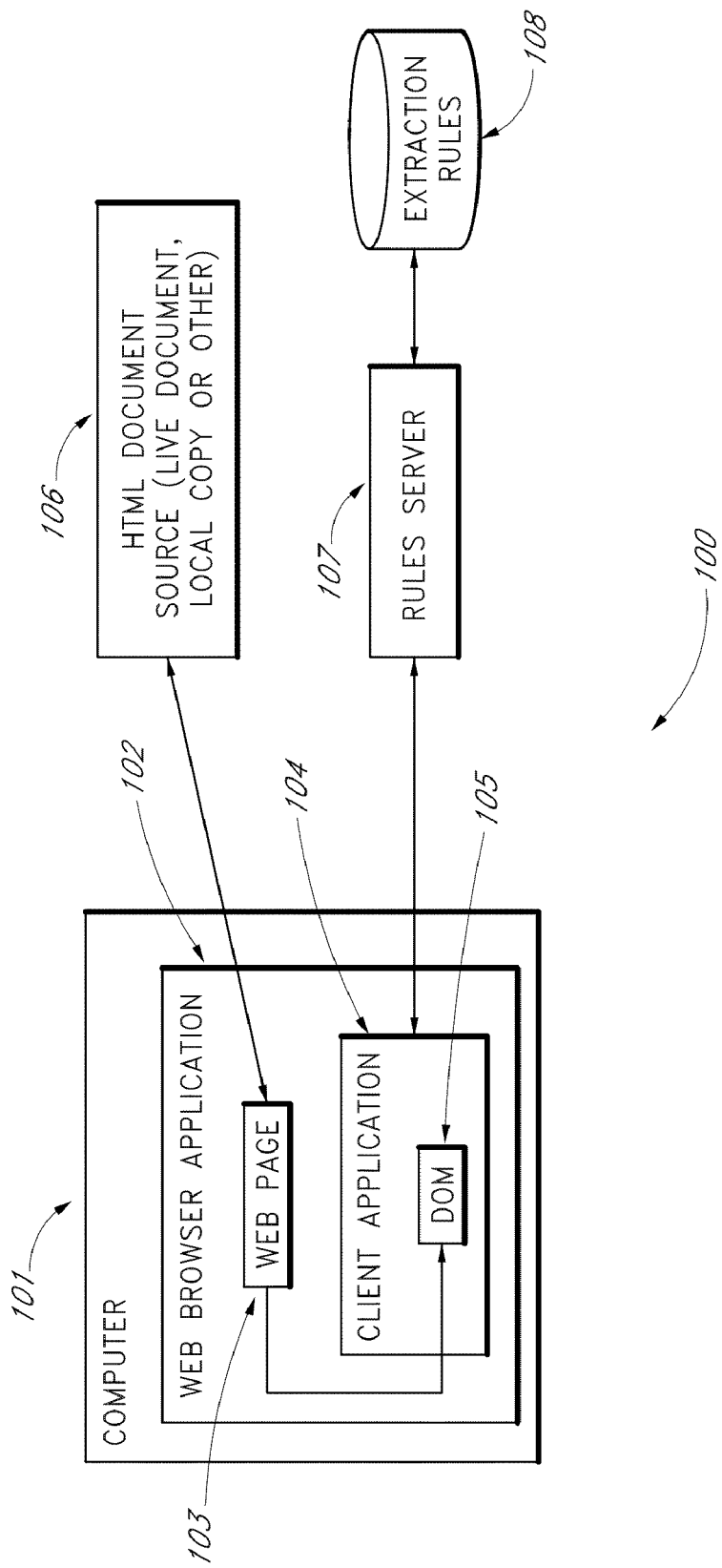
FIG. 1 illustrates a system for creating and training extraction rules in accordance with one embodiment of the invention.

FIG. 1 illustrates a system 100 in accordance with one embodiment of the present invention, and will be used to explain the general process by which extraction rules may be generated and trained under the control of a user. As will be recognized, the inventive methods described herein for generating and training extraction rules are not limited to the particular environment shown in FIG. 1.

In the embodiment shown in FIG. 1, a user browses the web through an Internet-connected computer 101 running a web browser 102. The web browser 102 runs on the computer 101 in conjunction with a client application 104 which is responsible in the illustrated embodiment for generating the extraction rules. In browsing the web, the user causes the web browser to retrieve a web page 103 from a source 106, such as a web server. Although web pages are typically coded in HTML, web pages may be created or coded using other formats. For example, a web page may be coded using XML, VoiceXML, or other markup languages.

Upon receiving the web page, the web browser creates a structured graph representation of the web page, such as the Document Object Model (DOM) representation 105, which can be shared with the client application 104. However, in other implementations of the invention, the client application 104 may generate its own DOM, or other structured graph representation, based on the HTML document. Currently available web browsers, such as the NETSCAPE NAVIGATOR and INTERNET EXPLORER browsers, are typically configured to create the structured graph representation in order to allow a web page to be dynamically manipulated by code, such as JAVASCRIPT, embedded in the web page. In the DOM representation, different tags or portions of the web page are represented as different nodes of a hierarchical node structure.

Figure 2:
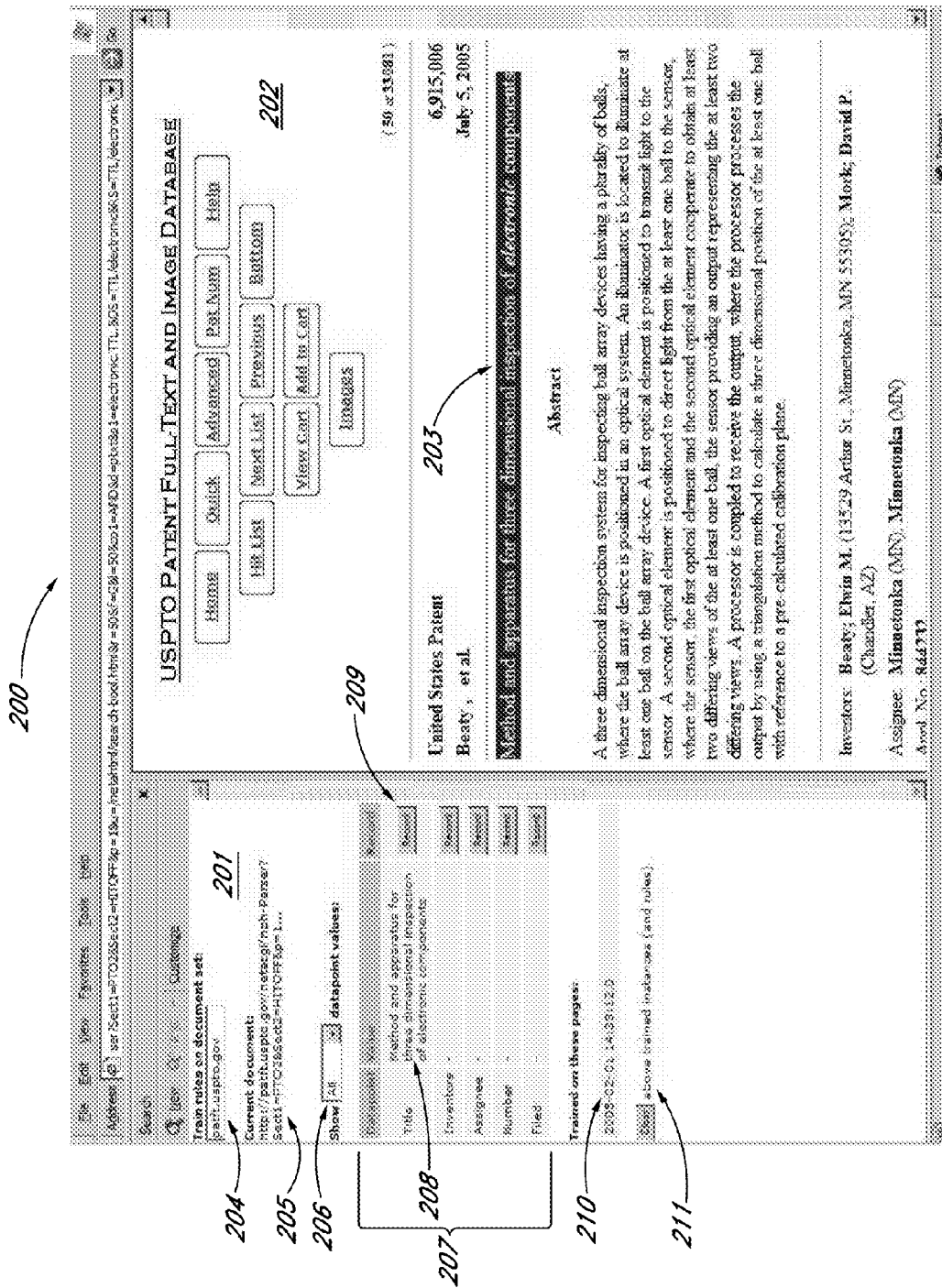
FIG. 2 illustrates one embodiment of a browser plug-in that may be provided to enable a user to interactively control the generation and training of extraction rules.

In one embodiment, the client application 104 is implemented through a plug-in or applet that runs within or alongside the web browser on the user's computer and communicates with a rules server 107 which maintains a database 108 of extraction rules. In this embodiment, which is depicted in FIG. 2 and described below, a user wishing to create/train extraction rules initially loads a web page into the browser. The user then selects a datapoint (e.g., text string) for which an extraction rule is to be created or trained, and then selects a corresponding button to initiate the rule generation/training process. The methods the client application 104 uses to create and train extraction rules are described below. In some embodiments, the client application 104 also includes functionality for applying the extraction rules to web pages to test their accuracy.

Although the rule generation and training methods in the illustrated embodiment of FIG. 1 are implemented in a client application 104 running on the user's computer 101, the invention is not so limited. For instance, the rule generation and training methods can be implemented as a web service to which calls are placed over the Internet. This web service may, for example, include an application program interface (API) through which a user can pass to the web service an HTML document with the element of interest marked with a special attribute (e.g., <font DATA_POINT="Price">$34.45</font>, where the DATA_POINT attribute has been added by the user to mark the datapoint of interest). The web service may then apply the rule generation and training methods to this document as described below. The web service may also implement methods for applying the generated extraction rules to a set of web pages specified by a user, and returning the extracted data.

In the illustrated embodiment of FIG. 1, the extraction rules generated by the client application 104 are stored on the rules server 107. This allows multiple instances of the client application 104 (and/or other software components), which may run on different computers 101, to be used in combination to generate, train, and test the extraction rules. However, the rules could additionally or alternatively be stored on a storage device local to the client application 104.

b. Example User Interface

FIG. 2 illustrates one example of a rules-training UI 201 that may be provided by the client application 104 for purposes of interactively creating and training data extraction rules. In this example, the client application 104 is a browser plug-in or "toolbar" program that persistently displays the rules-training UI 201 as a user browses from one web page to another. As will be apparent, however, the rule generation and training methods of the present invention do not require such a user interface, and do not require the use of a browser plug-in program. Although not illustrated in FIG. 2, the client application 104 may also provide a user interface for testing the accuracy of existing rules.

In the illustrated embodiment of FIG. 2, when the user initially directs the web browser 102, 200 to load a web page of a web site, the client application 104 retrieves from the rules server 107 any data extraction rules and corresponding datapoint descriptors that currently exist for the web site. In the particular example shown in FIG. 2, the user has loaded a web page 202 of the uspto.gov web site, and more specifically, a web page corresponding to a particular U.S. patent. In response to the loading of this web page 202, the client application 104 has loaded the rules set associated with the web site domain name "patft.uspto.gov," as indicated by field 204 of the rules-training UI. The rules-training UI 201 also displays the following items: (a) the URL 205 of the currently loaded web page; (b) a drop-down box 206 for selecting the datapoints to be displayed; (c) a table 207 that includes the datapoint name, datapoint value, and a "record" button 209 for each displayed datapoint, (d) a date/time stamp 210 indicating when this set of rules was last trained; and (e) a button 211 for clearing the currently loaded rules and training data.

In this example, the following five datapoints have been defined in the rules server's database 108 for the uspto.gov web site: "title," "inventors," "assignee," "number," and "filed." Each of these datapoints corresponds to a particular type of information commonly included in a patent document, and thus included on corresponding patent detail pages 202 of the uspto.gov web site. For each datapoint, one or more data extraction rules may exist for extracting corresponding datapoint values from web pages. Although a single data extraction rule will often be sufficient for a given datapoint, multiple rules for the same datapoint may be provided to accommodate different web page structures. For example, due to structural differences between web pages of the web site, two or more data extraction rules may exist for extracting patent title information from uspto.gov web pages. As described below, these rules may be applied in combination to a given web page to extract the datapoint, with an appropriate conflict resolution policy used to handle different outcomes of different rules. In one embodiment, a system administrator can add new datapoint descriptors to the rules server's database 108 in connection with a particular web site to enable the generation of one or more corresponding rules.

In the embodiment illustrated in FIG. 2, the user creates and trains rules as follows. Initially, the user highlights the text corresponding to a given datapoint. The user then selects the corresponding "record" button to cause the client application 104 to create a "trained instance" of the web page. The steps that are performed by the client application 104 to generate extraction rules from the trained instances are described below with references to FIGS. 3-5. These steps may alternatively be performed by a separate component, such as a server application which runs on the rules server 107.

In the illustrated example, the user has highlighted the patent title 203, and has selected the "record" button to create a trained instance for extracting patent title information from uspto.gov web pages. Selection of the record button has caused the title to be displayed in the corresponding field 208 of the table 207. The user may repeat this process for each of the other four datapoints ("Inventors," "Assignee," "Number" and "Filed") defined for uspto.gov web pages. In addition, the user may browse from one patent detail page of this web site to another and repeat the training process so that the data extraction rules will ultimately be based on, and will take into consideration differences between, a number of different web pages. As data extraction rules are created and modified via this process, the client application 104 sends the created or updated data extraction rules to the rules server 107 for storage thereon.

Although not illustrated in FIG. 2, the UI 201 of the client application 104 may also include controls for enabling the user to apply existing rules to a loaded web page, and to then provide feedback regarding whether the data (if any) extracted from the web page matches the expected data. This feedback may be used by the rules server 107, or some other component, to maintain reliability data for particular rules or rule sets. Rules for which the reliability falls below a particular threshold may be blocked from being used, and/or may be flagged for further training The rules server 107 may store extraction rules for many different web pages and webs sites, and may interact with many different computers 101 and associated instances of the client application 104. The extraction rules may be stored in the database 108 in association with particular domain names and/or URLs, as described, for example, in U.S. Pat. Pub. 2002/0143659 mentioned above.

The data extraction rules may be used for various applications that involve the automated extraction of data from web pages. As one example, the rules may be used by a web crawler system to automatically build a database of information about various types of items, such as products, news articles, patents, jobs, merchants, blogs, or any other types of item. As another example, a browser plug-in of the type described in U.S. Pat. Pub. 2002/0143659 may retrieve and apply the rules for a web page currently being viewed by a user, and then use the extracted information to retrieve and display supplemental information. For instance, while a user views a particular patent page of the uspto.gov web site, the browser plug-in (which would typically be separate from the plug-in 104 shown in FIG. 2) may extract the assignee name, and then retrieve and display information about other patents owned by this same assignee.

c. Terminology

Before going into greater depth on how a particular embodiment of a client application 104 creates a new extraction rule, modifies an existing extraction rule, and applies an extraction rule against an HTML document to find matching datapoints, it will be helpful to lay out some basic terminology that will be used.

A datapoint is an individual piece of data to be extracted from an HTML document. A datapoint may, for example, represent an author's name or a book title. A datapoint need not be text, but rather can include other types of content elements. Different web pages may have different values for the same datapoint.

A trained instance is a representation of an HTML or other markup language document which has had a datapoint marked for use to create an extraction rule.

A document set is a set of markup language documents (HTML documents in the illustrated embodiments) with a similar structure. Usually a document set contains HTML documents from a single web site; however, other pages with a similar HTML structure, such as commonly created web blogs, could also be used to create a document set.

A node function is a function which takes a DOM node as an argument and returns specific information about that node. For example, a node function may fetch information on the name of the node, the node's location in its encompassing data structure, attributes of the HTML code that the node represents, etc.

A node function matrix ("NFM") stores the results of all node functions applied to a node and its parents, up to a predetermined number of nodes. A NFM can be defined for any node in the DOM. A data structure containing a NFM may be implemented as a 2-dimensional table where each column represents the result of one particular node function and each row represents the node against which that node function was run. The table would start with the selected node of interest and work backwards up the DOM to fill the table with the specified number of parent nodes.

A common node function matrix ("CNFM") may be generated by taking the intersection of two NFMs, usually created from two related web pages. To create a CNFM, the cells in a given location in the first NFM are compared to the cells in the same locations in the second NFM. If two cells that are compared are sufficiently similar, the resulting CNFM at that location will have the value of those cells. If the cells are not sufficiently similar, the resulting CNFM will have a null object in that cell location. Two cells may be treated as sufficiently similar if, for example, the comparison reveals an exact string match, a string match up to N characters, or any other metric appropriate for the implementation. A NFM, standing alone, may be considered a CNFM which has been intersected with itself or intersected with nothing at all. Structurally, the two matrices are identical.

A template matrix stores a weighting for each non-empty cell of a CNFM. There are many possible methods for calculating the exact weighting of a given cell. One of the simplest methods is to give the greatest weighting to the DOM node which served as the basis of the CNFM, and to then give proportionally lesser weight to successive parent nodes in the matrix. Other factors could also be used to influence the weighting, such as the particular node function used to define a column in the matrix.

An extraction rule is a logical construct which can be represented by a data structure that contains information on how to extract a datapoint from a document set. In the particular embodiments described herein, an extraction rule, at its core, is the combination of a CNFM (or NFM) and a template matrix. An extraction rule can also be a combination of other extraction rules. For example, a certain document set may have two styles of HTML documents which contain the same datapoint in different locations on their respective page. Two extraction rules for the same datapoint, one for each style of HTML document, could initially be created. These two rules could then be combined as sub-rules of a single extraction rule for the datapoint. When the extraction rule composed of sub-rules is applied, each sub-rule would be applied independently against an HTML page, and the node selected as the match for the combination extraction rule would be the node with the highest correlation as selected by one of the sub-rules.

Hierarchical agglomerative clustering is a standard clustering technique in which items are clustered together in a series of steps. In each successive step, the clusters that are "closest" together are merged. Closeness may be defined by a proximity function, and this closeness typically must be greater than a certain threshold value before the clusters are merged. In the context of the current invention, rules for extracting the same datapoint are often clustered together. If the rules are sufficiently similar, the two rules are merged into a single new rule. This process helps distill out the information that is important in finding the datapoint from the information that is simply noise. However, depending on the set of trained instances used to train the extraction rule, it may not always be possible to cluster together extraction rules for a datapoint down to a single extraction rule that produces reliable results. If the rules are not similar enough to warrant a complete merger, they may be kept distinct, and used as sub-rules of a "rule of rules" extraction rule.

d. Extraction Rule Creation and Training

Figure 3:
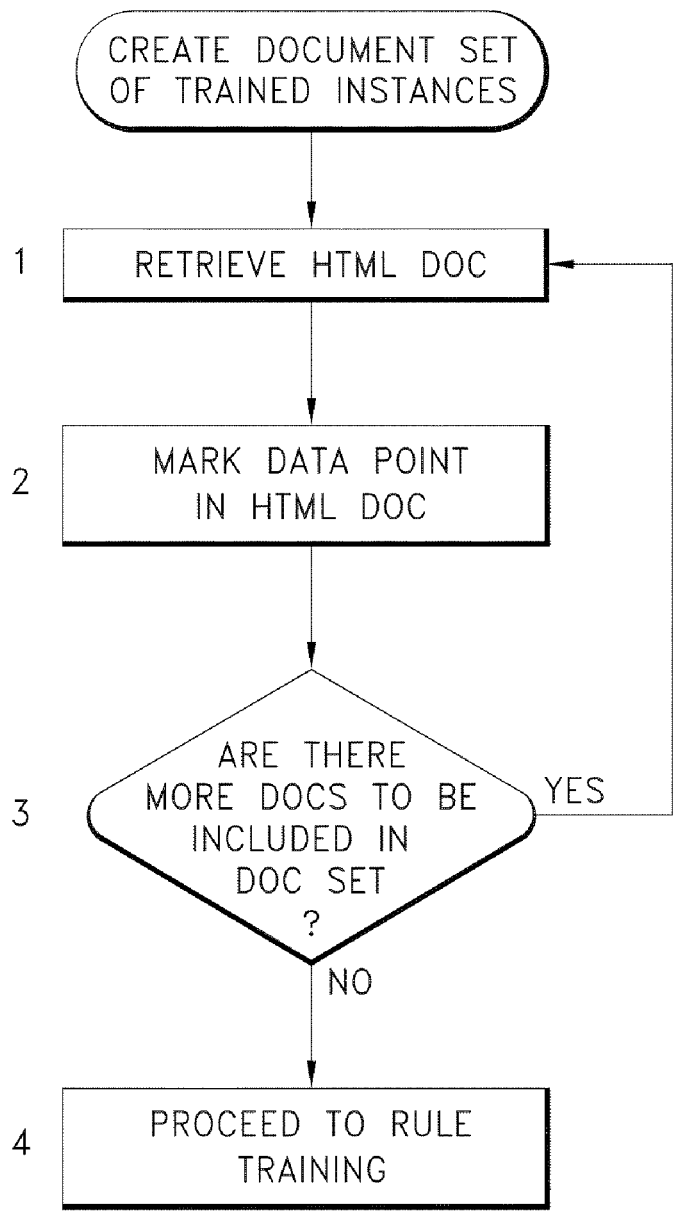
FIG. 3 illustrates one embodiment of a process by which trained instances of markup language documents may be created for purposes of generating extraction rules.
Figure 4:
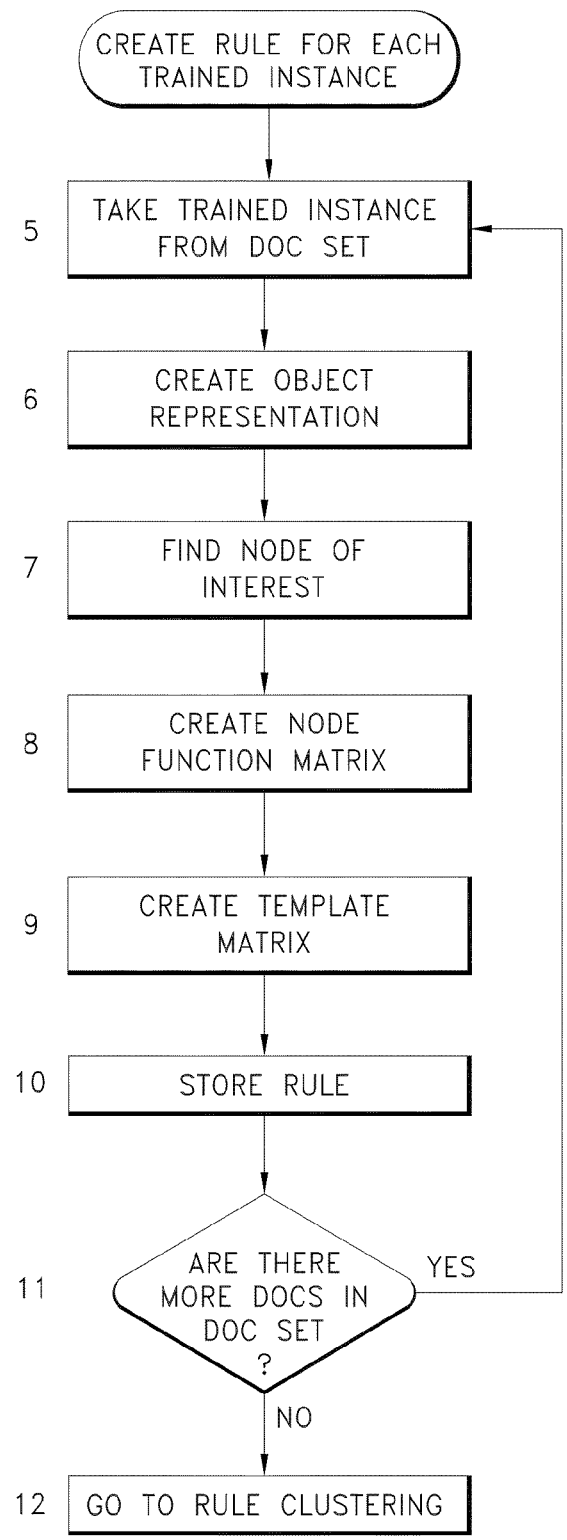
FIG. 4 illustrates one embodiment of a process by which trained instances may be converted into extraction rules.
Figure 5:
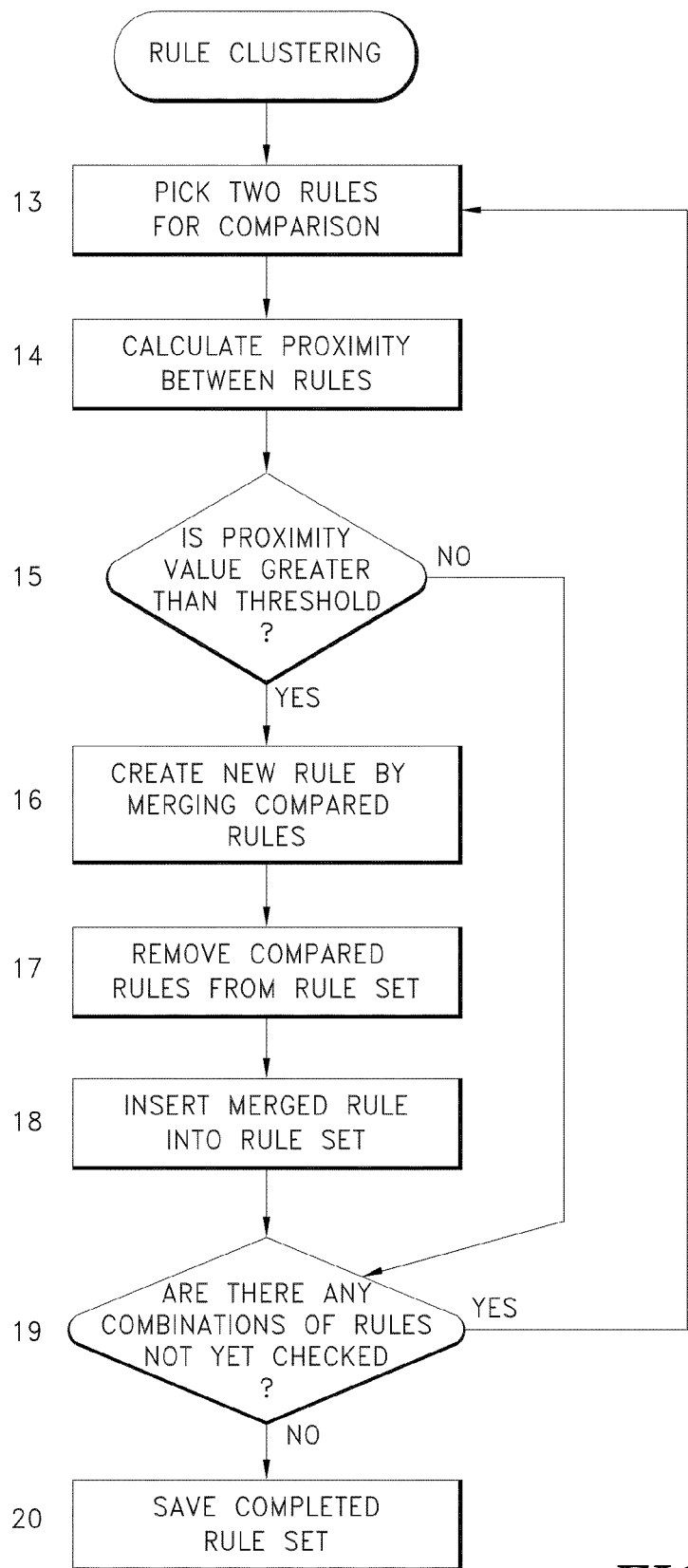
FIG. 5 illustrates one embodiment of a clustering process by which similar rules are merged.

FIGS. 3-5 illustrate methods for creating and training extraction rules in accordance with one embodiment of the present invention. These methods may be embodied in, but are not limited to, a client application 104 of the type described above. FIG. 3 shows the steps involved in creating a set of trained instances which target a common data point for an extraction rule. FIG. 4 shows how an extraction rule is created for each trained instance. FIG. 5 illustrates a process by which extraction rules created using the trained instances may be merged into a "final" set of one or more extraction rules that can be used to extract datapoints from web pages.

In FIG. 3 at step 1, an HTML document is retrieved. At step 2, the specific datapoint which is to be the subject of the extraction rule is selected in the page. A datapoint can be something such as an author's name or the title of the page. This process creates a trained instance of an HTML document and is repeated for each HTML document that is to be converted into a trained instance used for the construction of this particular extraction rule. In the embodiment depicted in FIG. 2, this entire process is accomplished through a standard web browser with the client application 104 implemented as a toolbar application in the browser. The datapoint is selected by highlighting the text in the web browser and then pressing the appropriate record button on the toolbar application. The selected datapoint can then be represented in the HTML code of the newly created trained instance by inserting a new attribute within the HTML tag containing the datapoint. This newly created trained instance can reside on disk, in memory, or in any other location convenient for the client application. As depicted by blocks 3 and 4 of FIG. 3, if any additional documents are to be included in the document set, steps 1 and 2 are repeated for the next document; otherwise, the rules training process is initiated.

In FIG. 4 at step 5, a single trained instance is taken from the set of trained instances created in FIG. 3. An object model of the trained instance is then created (step 6). In one embodiment of the invention, this is done using the Document Object Model ("DOM"), which creates a graph representation of the trained instance. The resulting data structure is then searched for the node of interest (step 7). The node of interest is the node in the object model which contains the datapoint selected in steps 1-4.

At step 8, the node of interest is used as a starting point to create a NFM. The NFM is a table which contains values which are the output of a set of node functions. The set of node functions to be used in extraction rule creation are defined before rule creation begins. Each of these functions is run against the node of interest, and its resulting output is stored in the NFM. The node functions are then run against the parent node of the node of interest, the grandparent of the node of interest, and so on until a specified number of nodes have been entered into the NFM. A sample NFM is represented by the following table:

| NFM | fn 1 | fn 2 | fn 3 |
| --- | --- | --- | --- |
| node of interest | "July 5, 2005" | "30" | "td" |
| node of interest -1 | | "250" | "tr" |
| node of interest -2 | | "100%" | "table" |

This table could represent the data extracted in connection with a node of interest that was a "<TD>" element in an HTML table. Fn1 extracted the data value of the nodes (note that two of the nodes had no value in this example). Fn2 extracted an attribute of the nodes, such as width. Finally, fn3 extracted the name of the node.

At step 9, a template matrix is created from the NFM. For the following illustrative example, a basic weighting function based solely on a node's distance from the selected node is used to calculate a cell's weight. A sample template matrix is represented by the following table:

| Template Matrix | fn 1 | fn 2 | fn 3 |
| --- | --- | --- | --- |
| node of interest | 1 | 1 | 1 |
| node of interest -1 | | .67 | .67 |
| node of interest -2 | | .33 | .33 |

At step 10, the NFM and template matrix are then stored together as an instance of an extraction rule. Once an NFM is incorporated into an extraction rule, it is called a Common Node Function Matrix ("CNFM"). This change in nomenclature is used because, as similar extraction rules are eventually clustered together later in the process, this matrix undergoes transformations which result in the matrix only storing information common to all of the extraction rules merged into it. This clustering process will be explained in greater detail below. The extraction rule creation process is then repeated for each trained instance in the current document set. A single instance of a stored extraction rule is represented by the following table:

| Extraction Rule | fn 1 | fn 2 | fn 3 |
| --- | --- | --- | --- |
| node of interest | ["July 5, 2005", 1] | ["30", 1] | ["td", 1] |
| node of interest -1 | | ["250", .67] | ["tr", .67] |
| node of interest -2 | | ["100%", .33] | ["table", .33] |

As depicted by step 11, the above process is repeated for any remaining documents in the document set, or in the embodiment shown in FIG. 2, until the user finishes browsing the current web site. At step 12, rule clustering (FIG. 5) is initiated.

FIG. 5 illustrates one embodiment of a process for clustering the extraction rules created via the process of FIG. 4. The clustering process may be applied solely to the rules generated for a particular web site during the current training session, or may also be applied to rules retrieved from the rules server 107 for this web site. Further, this process could be implemented by the rules server 107 instead of the client application 104.

In step 13 of FIG. 5, two extraction rules in the set of rules are chosen for comparison. This comparison is done using a proximity function (step 14). The proximity function looks at the cells in the same row and column in each extraction rule and looks to see how closely related the two rules are. As one example, a proximity function might determine whether the first N characters of the entries are the same. If the entries are similar enough, the weighted value of the cells are taken from the template matrix and given to a correlation function. The following is an example of a correlation function that may be used for this purpose, where the only inputted cells are those which sufficiently match.

$$r = \Sigma(a_{i,j} * b_{i,j}) / \sqrt{(\Sigma(a_{i,j} * a_{i,j}) * \Sigma(b_{i,j} * b_{i,j}))}$$

Each corresponding set of cells in the extraction rules is examined in this manner to calculate the final proximity value. If the resulting proximity is above a certain threshold (step 15), the extraction rules are merged (step 16). This merging process improves the reliability of the rule set by retaining information helpful for extracting a given datapoint from two or more web pages, while discarding other information. This is done by first extracting the CNFM from each extraction rule, and creating a new CNFM which is the intersection of the two matrices. Each cell in the first table is examined with its corresponding cell in the second table. If the values then the value is stored in the new CNFM. Otherwise, a null object, or other designation, is used to indicate a mismatch at that cell location. A template matrix is then created using this new CNFM and the process outlined at step 9.

In some embodiments, the compared values may be treated as matching if, for example, the first N characters of the two values match. In such embodiments, if a match is found, then only the first N characters are stored in the CNFM. When the extraction rule is later applied to a web page, only the first N characters of the target value are checked.

The two extraction rules which were combined are then removed from the set of extraction rules to be examined (step 17), and this newly created template matrix and CNFM are inserted into the set of rules as a new extraction rule (step 18). This process of clustering extraction rules is repeated until there are no combinations of extraction rules which have proximity greater than the specified threshold (step 19). The resulting set of extraction rules is then ready for use in finding a specific datapoint in an HTML document. The set of extraction rules is saved in the appropriate repository, such as a database of the rules server 107, for later use (step 20).

e. Extraction Rule Application

Extraction rules are applied to HTML documents in an attempt to extract the desired datapoints based on the past experiences with similar pages that are incorporated into the extraction rule. Each individual datapoint will typically have a set of extraction rules which can be used to find that particular piece of data. For example, if there were two desired datapoints on a page, for instance an author's name and a book's title, there could be three extraction rules used to find those two datapoints: [[R1, R2], [R3]]. R1 and R2 represent two separate extraction rules which could be used to find an author's name in a given webpage; R3 represents one extraction rule used to find the title of a book in the same page.

Figure 6:
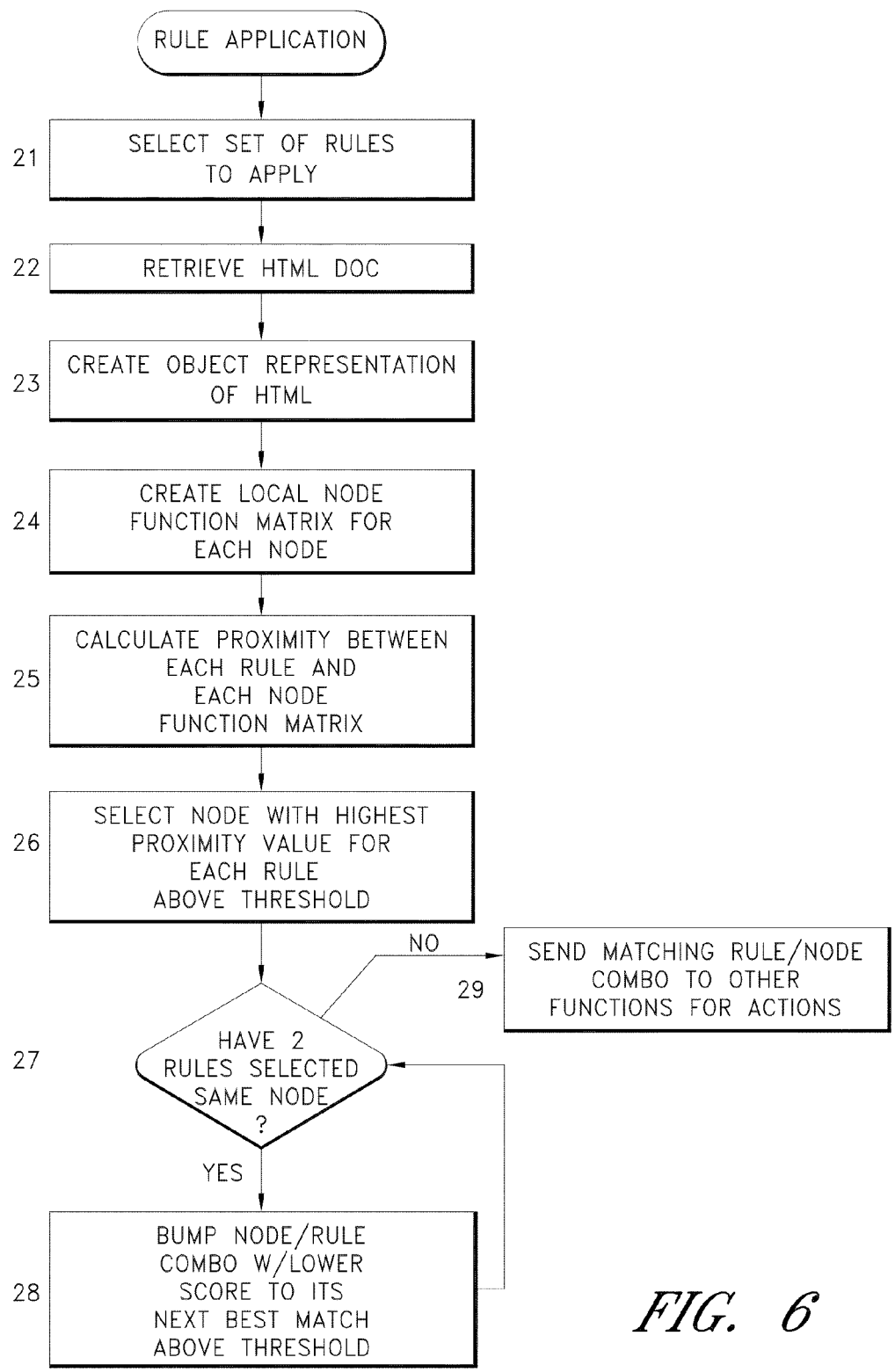
FIG. 6 illustrates one embodiment of a process by which extraction rules may be applied to markup language documents to extract datapoints.

FIG. 6 illustrates a method for applying created extraction rules to an HTML document. In steps 21 and 22, the extraction rules corresponding to the loaded HTML page are retrieved. An object model, such as DOM, is then used to create a data representation of the HTML document (step 23). In step 24, a local NFM is created for every node in the tree. This is done using the same node functions and according to the same method outlined in connection with step 8. Step 25 calculates the correlation between each local NFM at each node and each extraction rule in our set of rules to be applied against the HTML document. The correlation between a given local NFM and a given extraction rule is calculated according to the same proximity method as described in connection with step 14, although a formula distinct from the proximity method can also be used.

For example, suppose there are two extraction rules, one of which is a rule of rules, being applied against a given HTML document. Those three extraction rules correspond to two datapoints in the following manner: [[R1, R2], [R3]]. Further suppose that the HTML document is represented by three DOM nodes, with Node 1 being the child of Node 2, and Node 2 being the child of Node 3. The resulting correlation between the extraction rules and the nodes might look something like this:

| | Node Correlation | | |
|---|---|---|---|
| Ex. Rule | N1 | N2 | N3 |
| R1 | .97 | .76 | .4 |
| R2 | .45 | .92 | .2 |
| R3 | .95 | .93 | .5 |

Once these correlation values are calculated for each extraction rule/node combination, the process of selecting which node is ultimately selected for each extraction rule begins. At step 26, the node with the highest correlation value for each extraction rule is selected that is still above a given threshold, say for instance 0.9. If an extraction rule does not have a correlation with a node above this threshold, then no match is made for that rule. In the above illustration, N1 would be selected for R1 and R3, while N2 would be selected for R2. For extraction rules that are clustered together for the same datapoint, the highest correlating node is the node ultimately selected. This would mean that for the extraction rule represented by the combination of R1 and R2, N1 would be the node selected as representing the matching datapoint. At step 27, conflict resolution between datapoints begins. The same piece of information in an HTML document cannot represent two distinct datapoints. When extraction rules relating to two separate datapoints select the same node, the rule with the higher correlation gets to keep its selected node, while the rule with the lower correlation selects its next best match, if possible (step 28).

In the illustrated example, R3 would no longer select N1 as its best matching node since the extraction rule represented by R1 and R2 has selected that node as its match with a higher correlation than R3 and N1; instead, R3 would now select N2. The correlation between R3 and N2 is still above the specified threshold, in this example 0.9, and so this is a valid match that the algorithm can make with confidence. If R3's next best match was below this threshold, then no node would be selected as a matching node for R3. This datapoint conflict check process is repeated until there are no further datapoint conflicts. In this example, datapoint conflict resolution has run to its completion.

Once this entire extraction rule application method is completed and each extraction rule has the node which is its best match in the HTML document, then the nodes can be passed on to other functions (step 29) for further processing depending on the desired use. Examples of further use include recording the value of the node in a database, using the nodes to take actions on the web page such as clicking a link or submitting a form, or any other use one could imagine for a node.

The process depicted in FIG. 6 may optionally be implemented in the client application 104 for purposes of reliability testing. For example, in one embodiment, the client application 104 may be placed in a testing mode in which it applies the applicable rules to the web page currently loaded by the web browser. While operating in this mode, the extracted data is displayed to the user, and the user is prompted to indicate whether the correct data was extracted. This feedback may in turn be used to remove or inhibit the use of unreliable rules. In another embodiment, the client application 104 does not include any functionality for applying the extraction rules, but rather is used solely to create and train the rules.

The process depicted in FIG. 6 may also be embodied in any other application, component or service that extracts information from web pages. For example, the process may be embodied within a web crawling application that applies a set of rules against a number of different web pages. The web crawling application could then take a variety of other actions based on the results of the application of rules.

f. Alternative and Additional Embodiments

In addition to the embodiments described herein, many other alternative and additional embodiments of the invention exist. For example, it is possible to have embodiments which only implement the extraction rule creation methods or only implement the extraction rule application methods. For instance, one embodiment of the invention could be a web scraping service which takes extraction rules generated and stored by another application and applies them to a set of web sites on a periodic basis. The web scraping service could generate reports, create alerts triggered on the outcome of its application of extraction rules or on data it extracts, or take other useful action.

As another example, although each extraction rule in the embodiments described herein corresponds to a particular datapoint, other embodiments may support the generation and use of an extraction rule capable of extracting multiple distinct datapoints from a given web page.

As yet another example, rather than generating extraction rules that correspond to individual documents and then clustering and merging the extraction rules that are similar, a set of similar documents that include the desired datapoint may initially be identified and clustered, and then used collectively to generate a single extraction rule. This may be accomplished using substantially the same computations as described above. For instance, the proximity function described above can be used to compare two (or more) web pages—and more specifically the relevant DOM node values of these web pages—to determine whether they are sufficiently similar to be used in combination to generate an extraction rule. If sufficient similarity exists, the relevant node values that are common to these web pages may be identified and used to generate the extraction rule in the same manner that NFMs are merged in the embodiment described above.

Although this invention has been described in terms of certain embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the following claims.

What is claimed is:

1. A computer-implemented method of extracting a datapoint from a markup language document using multiple extraction rules, the method comprising:
   applying a first extraction rule to a structural graph representation of the markup language document to generate a first correlation value for each of a plurality of nodes of the structural graph representation, each first correlation value representing a degree to which the respective node is correlated with the first extraction rule;
   applying a second extraction rule to the structural graph representation of the markup language document to generate a second correlation value for each of the plurality of nodes of the structural graph representation, each second correlation value representing a degree to which the respective node is correlated with the second extraction rule, wherein the first and second extraction rules correspond to a common datapoint; and
   selecting, from the plurality of nodes, a single node from which to extract the datapoint, wherein selecting said single node comprises, by a computer system: (a) comparing the first correlation values to each other to identify a node most closely correlated with the first extraction rule, (b) comparing the second correlation values to each other to identify a node most closely correlated with the second extraction rule, (c) determining whether the node most closely correlated with the first extraction rule is the same as the node most closely correlated with the second extraction rule, and (d) when the node most closely correlated with the first extraction rule is not the same as the node most closely correlated with the second extraction rule, selecting one of said two most closely correlated nodes based on a comparison of their respective correlation values.

2. The method of claim 1, wherein selecting the single node additionally comprises comparing at least some of the first and second correlation values to a threshold that corresponds to a minimum degree of correlation needed for node selection.

3. The method of claim 1, wherein applying the first extraction rule to the structural graph representation comprises, by a computer system, generating respective a local node function matrix for each of the plurality of nodes.

4. The method of claim 3, wherein applying the first extraction rule to the structural graph representation further comprises using a proximity function to calculate a degree of correlation between each local node function matrix and the first extraction rule.

5. The method of claim 1, wherein the first extraction rule comprises a node function matrix and a template matrix.

6. A computer-implemented method of extracting a datapoint from a markup language document using multiple extraction rules, the method comprising:
   applying a first extraction rule to a structural graph representation of the markup language document to generate a first correlation value for each of a plurality of nodes of the structural graph representation, each first correlation value representing a degree to which the respective node is correlated with the first extraction rule;
   applying a second extraction rule to the structural graph representation of the markup language document to generate a second correlation value for each of the plurality of nodes of the structural graph representation, each second correlation value representing a degree to which the respective node is correlated with the second extraction rule, wherein the first extraction rule corresponds to a first datapoint and the second extraction rule corresponds to a second datapoint; and
   selecting, from the plurality of nodes, a single node from which to extract the first datapoint, wherein selecting said single node comprises, by a computer system: (a) comparing the first correlation values to each other to identify a node most closely correlated with the first extraction rule, (b) comparing the second correlation values to each other to identify a node most closely correlated with the second extraction rule, (c) determining whether the node most closely correlated with the first extraction rule is the same as the node most closely correlated with the second extraction rule, and (d) when the node most closely correlated with the first extraction rule is the same as the node most closely correlated with the second extraction rule, using the first and second correlation values to determine which of the first and second extraction rules to treat as producing an incorrect result.

7. Physical computer storage that stores executable code that instructs a computing system to extract a datapoint from a markup language document according to a method that comprises:

applying a first extraction rule to a structural graph representation of the markup language document to generate a first correlation value for each of a plurality of nodes of the structural graph representation, each first correlation value representing a degree to which the respective node is correlated with the first extraction rule;

applying a second extraction rule to the structural graph representation of the markup language document to generate a second correlation value for each of the plurality of nodes of the structural graph representation, each second correlation value representing a degree to which the respective node is correlated with the second extraction rule, wherein the first and second extraction rules correspond to a common datapoint; and selecting, from the plurality of nodes, a single node from which to extract the datapoint, wherein selecting said single node comprises: (a) comparing the first correlation values to each other to identify a node most closely correlated with the first extraction rule, (b) comparing the second correlation values to each other to identify a node most closely correlated with the second extraction rule, (c) determining whether the node most closely correlated with the first extraction rule is the same as the node most closely correlated with the second extraction rule, and (d) when the node most closely correlated with the first extraction rule is not the same as the node most closely correlated with the second extraction rule, selecting one of said two most closely correlated nodes based on a comparison of their respective correlation values.

8. The physical computer storage of claim 7, wherein selecting the single node additionally comprises comparing at least some of the first and second correlation values to a threshold that corresponds to a minimum degree of correlation needed for node selection.

9. The physical computer storage of claim 7, wherein applying the first extraction rule to the structural graph representation comprises, by a computer system, generating respective a local node function matrix for each of the plurality of nodes.

10. The physical computer storage of claim 7, wherein applying the first extraction rule to the structural graph representation further comprises using a proximity function to calculate a degree of correlation between each local node function matrix and the first extraction rule.

11. The physical computer storage of claim 7, wherein the first extraction rule comprises a node function matrix and a template matrix.

12. The physical computer storage of claim 7, wherein the method further comprises applying a third extraction rule to the structural graph representation of the markup language document to generate a third correlation value for each of the plurality of nodes, each third correlation value representing a degree to which the respective node is correlated with the third extraction rule, and wherein selecting said single node comprises using the first, second and third correlation values in combination to select said single node.

13. The physical computer storage of claim 7, in combination with a computer system that programmed, with said executable code, to extract the datapoint from markup language documents according to said method.

14. Physical computer storage that stores executable code that instructs a computing system to extract a datapoint from a markup language document according to a method that comprises:

applying a first extraction rule to a structural graph representation of the markup language document to generate a first correlation value for each of a plurality of nodes of the structural graph representation, each first correlation value representing a degree to which the respective node is correlated with the first extraction rule;

applying a second extraction rule to the structural graph representation of the markup language document to generate a second correlation value for each of the plurality of nodes of the structural graph representation, each second correlation value representing a degree to which the respective node is correlated with the second extraction rule, wherein the first extraction rule corresponds to a first datapoint and the second extraction rule corresponds to a second datapoint; and selecting, from the plurality of nodes, a single node from which to extract the first datapoint, wherein selecting said single node comprises: (a) comparing the first correlation values to each other to identify a node most closely correlated with the first extraction rule, (b) comparing the second correlation values to each other to identify a node most closely correlated with the second extraction rule, (c) determining whether the node most closely correlated with the first extraction rule is the same as the node most closely correlated with the second extraction rule, and (d) when the node most closely correlated with the first extraction rule is the same as the node most closely correlated with the second extraction rule, using the first and second correlation values to determine which of the first and second extraction rules to treat as producing an incorrect result.

\* \* \* \* \*

UNITED STATES PATENT AND TRADEMARK OFFICE
CERTIFICATE OF CORRECTION

| | |
|---|---|
| PATENT NO. | : 7,954,053 B2 |
| APPLICATION NO. | : 12/683190 |
| DATED | : May 31, 2011 |
| INVENTOR(S) | : Orelind et al. |

It is certified that error appears in the above-identified patent and that said Letters Patent is hereby corrected as shown below:

On the front page, at col. 1, item 73 ("Assignee"), change "Internaet" to --Internet--.

Signed and Sealed this
Twenty-third Day of August, 2011

David J. Kappos
*Director of the United States Patent and Trademark Office*